Nov. 13, 1962  J. P. VERGEZ, JR  3,064,175
TRANSISTORIZED VARIABLE SPEED MOTOR CONTROL
Filed Sept. 23, 1960  2 Sheets-Sheet 1

FIG. I.

INVENTOR
Jules Paul Vergez, Jr.

BY
Stevens, Davis, Miller, & Mosher
ATTORNEYS

Nov. 13, 1962  J. P. VERGEZ, JR  3,064,175
TRANSISTORIZED VARIABLE SPEED MOTOR CONTROL
Filed Sept. 23, 1960  2 Sheets-Sheet 2

INVENTOR
Jules Paul Vergez, Jr.
BY Stevens, Davis, Miller & Mosher
ATTORNEYS

3,064,175
TRANSISTORIZED VARIABLE SPEED MOTOR CONTROL

Jules Paul Vergez, Jr., Dallas, Tex., assignor to Texas Instruments Incorporated, Dallas, Tex., a corporation of Delaware
Filed Sept. 23, 1960, Ser. No. 57,940
10 Claims. (Cl. 318—341)

This invention relates to a transistor switch for controlling the speed of a motor.

More specifically this invention relates to a transistor switch for controlling a D.-C. series wound motor.

Series wound D.-C. motors have the property of decreasing their speed with an increase of the load applied thereto.

Prior art devices have attempted to control the speed of series wound D.-C. motors by placing a resistance in series with the motor. In control circuits of this type, much of the power applied to the motor is dissipated as heat in the added resistance element. Furthermore, variations in load will vary the current drawn by the motor thereby causing fluctuations in speed due to the IR drop in the series resistor.

Prior art devices have further attempted to control the speed of motors by intermittently pulsing a relay which alternately connects and disconnects the supply to the motor. The speed of the motor depends on the relative width of the intermittent On pulses. There is much wear caused by continually opening and closing a mechanical switch due to sparking. Relays also have inherent lag.

This invention overcomes these disadvantages in the prior art by utilization of a transistor as a switch in series with a voltage source and a motor. A driver periodically transmits driving pulses to the transistor switch of sufficient amplitude to maintain the switch in saturation. In this manner the transistor switch is periodically rendered conductive to control the speed of the motor. The speed of the motor is determined by the width of the driving pulse to the transistor switch. Changes in load will draw more current from the transistor switch and cause the switch to move into the unsaturated region of operation. This causes heat losses in and increased voltage drop across the switch. An automatic drive control senses the increased voltage drop across the switch and in response thereto induces the driver to increase the base drive to the switch thereby maintaining the switch in the saturated region of operation.

An object of this invention is to provide a novel motor speed control.

Another object of this invention is to provide a motor speed control circuit having substantially no heat losses in the control circuit.

Still another object of this invention is to provide a transistor operated as a pulse switch to control the speed of a D.-C. motor.

Further objects and features of this invention will be seen from the following description taken in conjunction with the drawings, in which.

Figure 1:
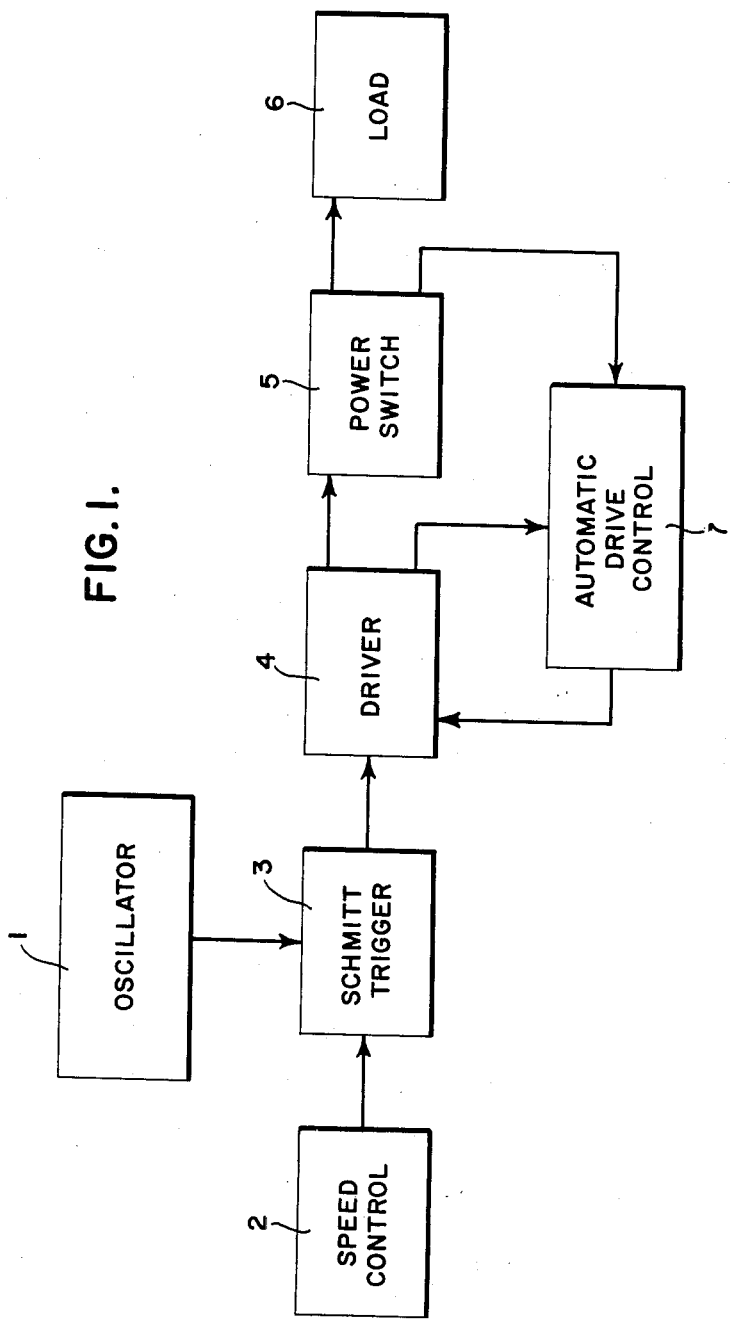
FIGURE 1 represents a block diagram of an embodiment of the invention.

Referring to FIGURE 1, a driver 4 controls a power switch 5 which furnishes power to a load 6. Driver 4 sends a periodic current of a given value which operates switch 5 when the driver is On. Driver 4 is energized by periodic pulses from Schmitt trigger 3, which is turned On and Off by oscillator 1 and speed control 2. The oscillator determines the period of the output pulses from the Schmitt trigger and the speed control determines the width of the pulses from said Schmitt trigger. In the event that there is an increased load, the voltage across the power switch 5 will increase. Automatic drive control 7 will cause driver 4 to increase its drive to the power switch in response to the change in voltage across the power switch. The increased drive will restore the voltage drop across the power switch substantially to the same value that existed prior to the change in load.

Figure 2:
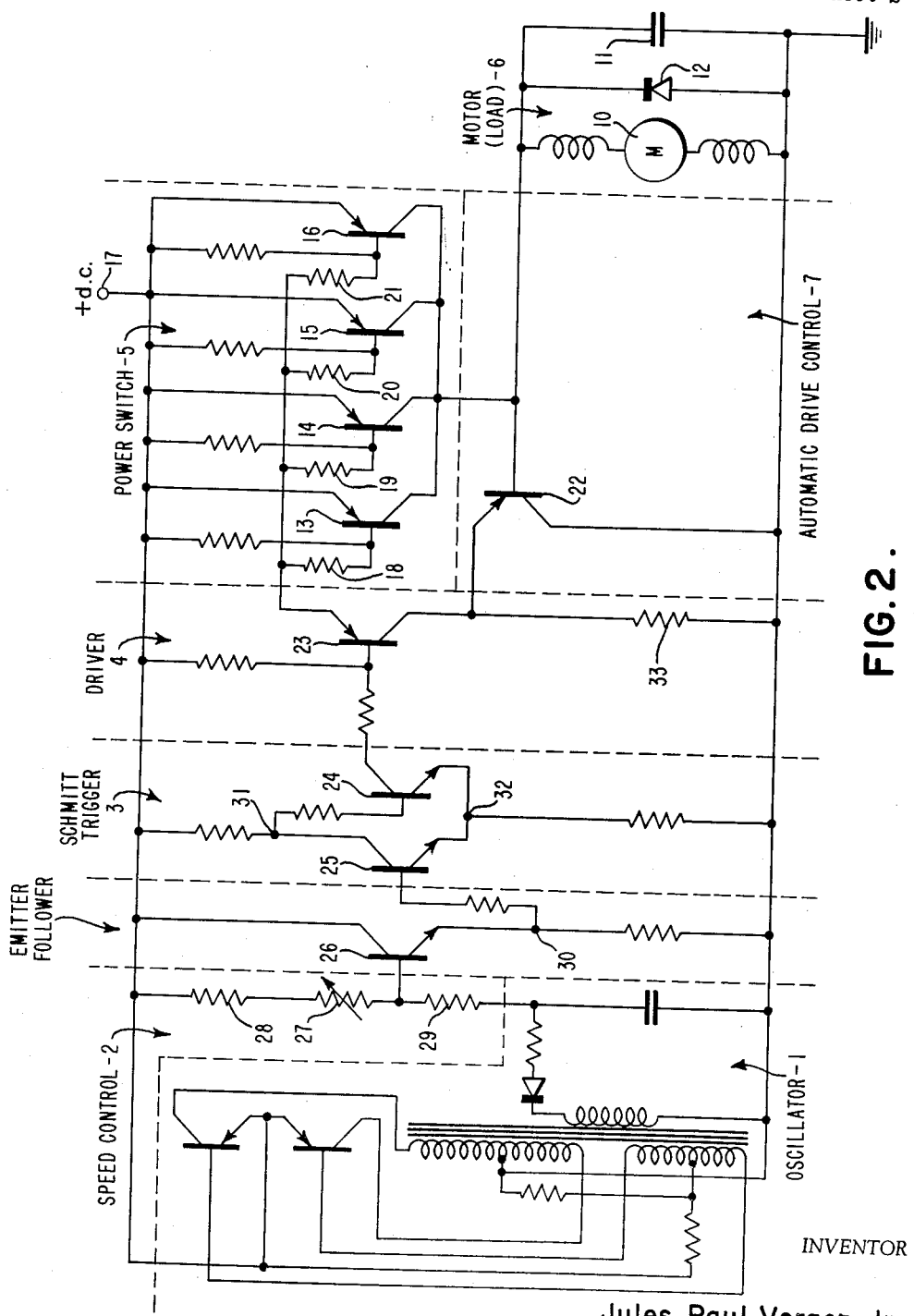
FIGURE 2 represents a schematic diagram of an embodiment of the invention.

Referring to FIGURE 2, which is a complete schematic diagram of the speed control system there is shown a motor 10 which is the load element of the system. A capacitor 11 and a rectifier 12 are each placed in parallel across the motor. It is to be understood that this system will operate in the same manner for any variable load element. The transistor power switch comprises four PNP transistors 13, 14, 15 and 16 which are in parallel with each other and in series with the motor and a D.-C. voltage source 17. It is to be understood that the number of transistors used in the power switch depends only upon the current requirement of the load and the current carrying capabilities of the transistors and accordingly this number will be varied to suit the current requirement of the load device. Resistors 18 to 21 of small value are placed in series with the base electrode of each power switch transistor in order to make the division of base current in these transistors depend largely upon the voltage across the base resistor rather than on the individual input characteristics of the power switch transistors. The automatic drive control comprises a PNP transistor 22 which is connected to the junction of the motor and the power switch through its base electrode. The emitter of transistor 22 is connected to the collector of PNP driver transistor 23. The emitter of driver transistor 23 connected to the base electrode of said power switch transistors through resistors 18–21. The Schmitt trigger comprises NPN transistors 24 and 25 which hold the driver transistor 23 in saturation or completely open depending upon the input signal. NPN transistor 26 is an emitter follower stage and is used to provide a high impedance load for sawtooth oscillator 1 and a low source impedance for the Schmitt trigger. The speed control comprises a voltage divider which includes resistors 27, 28 and 29. The voltage across the divider is a combination of the D.C. supply voltage 17 and the oscillator 1 output which is always negative with respect to ground and the D.C. supply. It should be noted that the oscillator can be any source of periodic pulses wherein the pulses have a gradual rise and fall in voltage. A sine wave generator, for example, would operate equally well in this circuit with minor design changes.

The operator of the circuit of FIG. 2 is as follows:

Oscillator 1 provides a negative going periodic sawtooth wave which is combined with the voltage from D.-C. source 17. This voltage is impressed across a voltage divider 27, 28, 29. When variable resistor 27 is set at zero ohms, transistor 26 is conducting. As resistor 27 is increased in value the base of transistor 26 will become relatively negative for a portion of each half cycle of operation and becomes non-conducting during this period. The ultimate speed of motor 10 is determined by the setting of resistor 27 since the period of conduction of transistor 26 will ultimately determine the duty cycle of the power switch. When transistor 26 is non-conducting the voltage at junction 30 decreases, thereby decreasing the voltage on the base of transistor 25 and making transistor 25 cease conducting. When transistor 25 is non-conducting the voltage at junction 31 increases and the voltage at junction 32 decreases thereby making transistor 24 conduct. When transistor 24 is conducting the voltage on the base electrode of transistor 23 is lowered thereby placing transistor 23 into the conductive state. When transistor 23 is conducting the voltage on the base electrode of each power switch transistor 13, 14, 15, 16 is lowered to place said power switch transistors into conduction. Driver transistor 23 is so designed that sufficient drive current will be made to flow into the base electrode of each power switch transistor to maintain these transistors in saturation. The power switch transistors supply power to the motor 10. A rectifier 12 and capacitor 11 minimize the possibility of damage to the power transistors when they switch Off the heavily inductive motor load. If the rectifier is added to the circuit, the reverse voltage induced in the motor windings during the switch Off cycle will be limited to the supply voltage. The possibility of damage to the power transistors is minimized by the addition of capacitor 11 because the capacitor opposes the supply voltage during the switch Off cycle thus allowing the current through the transistor to drop without the sudden voltage rise across the transistor.

For maximum efficiency it is desirable to maintain the power transistors in the saturated region as much as possible since the voltage across a transistor operating in the saturated region is very low. When motor 10 is subjected to additional load it draws more current and therefore drops in impedance. When the power transistors are required to draw more current they may shift their operating point to the non-saturated region. This can be explained in the following manner: As the load across a transistor varies while maintaining the same base drive and the same supply voltage, the load line upon which the transistor is operating is shifted. For increase in load the load line may be shifted to fall in the non-saturated region for a given base drive. In order to operate the transistor in the saturated region under the new load conditions and with the same supply voltage an increased base drive is required.

The voltage drop across the transistor increases as the transistor enters the unsaturated region. The base of transistor 22 is connected to the collectors of the power transistors and the emitter of said transistor 22 is connected to the collector of driver transistor 23. The voltage from emitter to base of transistor 22 is insufficient to cause said transistor to conduct when the power transistors are operating in the saturated region. This voltage difference is substantially about zero volts. However, when the load increases and the power transistors are made to operate in the unsaturated region the voltage drop across the power transistor increases. This causes the voltage at the base of transistor 22 to decrease and render said transistor 22 conductive. When transistor 22 conducts it places a decreased impedance path in parallel with resistor 33 in the collector circuit of driver transistor 23 causing the voltage of the collector of said driver transistor to drop. Thereby the voltage from emitter to collector of the driver transistor is increased resulting in an increased current flow through said driver transistor. The increased driver transistor current lowers the voltage at the base of each power transistor thereby causing said power transistors to again operate in the saturated region by shifting the operating point on the new load line, and decreasing the voltage drop across the power transistors.

It is noted that in all instances where an NPN transistor has been disclosed a PNP could have been used with the appropriate changes in voltage supplied to the electrodes. Also in all instances where a PNP transistor has been disclosed an NPN could have been used with the necessary voltage supply polarity changes.

Although the principles of the invention have been described in connection with specific apparatus, it is to be clearly understood that this description is made only by way of example and not as a limitation to the scope of the invention as set forth in the accompanying claims which are to be construed as broadly as possible in view of the prior art.

What is claimed is:

1. A control circuit comprising a source of voltage, a switch comprising at least one transistor, a variable load connected in series with said transistor across said source, a source of periodic pulses of predetermined amplitude connected to an electrode of said transistor for driving said transistor into conduction in the saturation region at a predetermined value of load impedance and means responsive to a change in value of the load impedance to a different value for varying the amplitude of the periodic pulses to maintain the transistor in the saturated region of operation at said different value of load impedance.

2. A control circuit comprising a source of voltage, a switch comprising at least one transistor, a variable load connected in series with said transistor across said source, means for producing a train of periodic pulses connected to an electrode of said transistor and of an amplitude to drive said transistor into conduction in the saturation region at a predetermined value of load impedance, means for varying the pulse width to vary the duty cycle of the switch and means responsive to a change in value of the load impedance to a different value for varying the amplitude of the periodic current to maintain the transistor in the saturated region of operation at said different value of load impedance.

3. A control circuit comprising a source of voltage, a switch comprising at least one transistor, a variable load connected in series with said transistor across said source, a driver transistor, means for periodically energizing the input of said driver transistor to produce periodic pulses at the output thereof, means for applying the periodic pulses from the output of said driver to said one transistor at an amplitude to render said one transistor periodically conductive in the saturated region at a predetermined value of load impedance and means responsive to a change in value of the load impedance to a different value for controlling the driver transistor to provide output pulses of a different amplitude to periodically maintain the one transistor in the saturated region of operation at said different value of load impedance.

4. A control circuit comprising a source of voltage, a switch comprising at least one transistor, a variable load connected in series with said transistor across said source, a source for providing periodic pulses of a predetermined amplitude and connected to a control electrode of said transistor for driving said transistor into conduction in the saturation region at a predetermined value of load impedance and a second transistor connected between the load impedance and the source for providing periodic pulses and responsive to a change in the value of the load impedance from the predetermined value, for varying the amplitude of the periodic pulses to maintain the one transistor in the saturated region of operation at said different value of load impedance.

5. A control circuit comprising a switch comprising at least one transistor having at least three electrodes, one terminal of a variable load connected to one of said electrodes, a source of voltage connected across a second electrode of said transistor and a second terminal of said variable load, a source of periodic pulses of predetermined amplitude connected to the third electrode of said transistor for driving said transistor into conduction in the saturation region at a predetermined value of load impedance and means responsive to a change in value of the load impedance to a different value for varying the amplitude of the periodic pulses to maintain the one transistor in the saturated region of operation at said different value of load impedance.

6. A speed control circuit for a D.-C. motor comprising a source of voltage, a switch comprising at least one transistor in series with said direct current motor connected across said source, a source of periodic pulses of predetermined amplitude connected to an electrode of said transistor for driving said transistor into conduction in the saturation region when said motor is drawing a predetermined amount of current and means responsive to a change in value of the current drawn by the motor to a different value for varying the amplitude of the periodic pulses to maintain the transistor in the saturated region of operation at said different value of motor current and means for varying the width of said pulses to control the speed of the motor.

7. A speed control circuit for a D.-C. motor comprising a source of voltage, a switch comprising at least one transistor in series with said direct current motor connected across said source, means for producing a train of periodic pulses connected to an electrode of said transistor and of an amplitude to drive said transistor into conduction in the saturation region when said motor is drawing a predetermined value of current, means for varying the width of said pulses to vary the duty cycle of said switch to control the speed of the motor and means responsive to a change in value of the current drawn by the motor to a different value for varying the amplitude of the periodic pulses to maintain the transistor in the saturated region of operation at said different value of load impedance.

8. A speed control circuit for a D.-C. motor comprising a source of voltage, a switch comprising at least one transistor in series with said direct current motor connected across said source, a driver transistor, means for periodically energizing the input of said driver transistor to produce periodic pulses at the output thereof, means for applying the preriodic pulses from the output of said driver to said one transistor at an amplitude to render said one transistor periodically conductive in the saturated region when said motor is drawing a predetermined value of current, means responsive to a change in value of the current drawn by the motor to a different value for controlling the driver transistor to provide output pulses of a different amplitude to periodically maintain the one transistor in the saturated region of operation at said different value and means for varying the width of said pulses to control the speed of the motor.

9. A speed control circuit for a D.-C. motor comprising a source of voltage, a switch comprising at least one transistor in series with said direct current motor connected across said source, a source of periodic pulses of predetermined amplitude connected to a control electrode of said transistor for driving said transistor into conduction in the saturation region when said motor is drawing a predetermined value of current, a second transistor connected between the motor and the source for providing periodic pulses and responsive to a change in the value of current drawn by the motor from the predetermined value for varying the amplitude of the periodic pulses to maintain the one transistor in the saturated region of operation at said different value of current drawn by the motor and means for varying the width of said pulses to control the speed of the motor.

10. A speed control circuit for a D.-C. motor having at least two terminals comprising a switch comprising at least one transistor having at least three electrodes, one terminal of said motor connected to one of said electrodes, a source of voltage connected across a second electrode of said transistor and a second terminal of said motor, a source of periodic pulses of predetermined amplitude connected to the third electrode of said transistor for driving said transistor into conduction in the saturation region when the motor is drawing a predetermined value of current, means responsive to a change in value of the current drawn by the motor to a different value for varying the amplitude of the periodic pulses to maintain the one transistor in the saturated region of operation at said different value of motor current and means for varying the width of said pulses to control the speed of the motor.

References Cited in the file of this patent

UNITED STATES PATENTS

| | | |
|---|---|---|
| 2,809,339 | Guggi | Oct. 8, 1957 |
| 2,867,763 | Sichling | Jan. 6, 1959 |